United States Patent [19]
Organek et al.

[11] Patent Number: 5,469,948
[45] Date of Patent: Nov. 28, 1995

[54] CLUTCH BALL RAMP ACTUATOR WITH COAST LOCK

[75] Inventors: Gregory J. Organek, Dearborn; David M. Preston, Clarkston; David A. Janson, Plymouth, all of Mich.

[73] Assignee: Eaton Corporation, Cleveland, Ohio

[21] Appl. No.: 189,342

[22] Filed: Jan. 31, 1994

[51] Int. Cl.[6] ............................ F16D 13/04; F16D 43/20
[52] U.S. Cl. .................. 192/35; 192/48.2; 192/48.92; 192/84 C; 192/93 A
[58] Field of Search ..................... 192/35, 70.23, 192/48.92, 84 C, 54, 40, 48.2, 93 A

[56] References Cited

U.S. PATENT DOCUMENTS

| | | | |
|---|---|---|---|
| 2,091,269 | 8/1937 | Colman | 192/40 X |
| 2,091,270 | 8/1937 | Colman | 192/93 A X |
| 2,605,877 | 8/1952 | Winther | 192/35 X |
| 2,649,941 | 8/1953 | Doebeli | 192/35 |
| 2,861,225 | 11/1958 | Mergen | 192/35 X |
| 3,000,479 | 9/1961 | Mosbacher | 192/35 |
| 4,805,486 | 2/1989 | Hagiwara et al. . | |
| 5,078,249 | 1/1992 | Botterill . | |
| 5,092,825 | 3/1992 | Goscenski et al. . | |

*Primary Examiner*—Rodney H. Bonck
*Attorney, Agent, or Firm*—Loren H. Uthoff, Jr.; Howard D. Gordon

[57] ABSTRACT

A ball ramp actuator having a control ring acting with an activation ring to supply an axial driveline clutch clamping force in a vehicle driving mode and a one-way clutch acting on the activation ring to maintain the clamping force when in a vehicle coast mode where one side of a one-way clutch is attached to the control ring and another side is attached to a support bracket that is frictionally coupled to a transmission input shaft to maintain an energized rotational relationship with the activation ring when in the coast mode.

13 Claims, 2 Drawing Sheets

CLUTCH BALL RAMP ACTUATOR WITH COAST LOCK

RELATED APPLICATIONS

This application is related to application U.S. Ser. No. 08/189,366 and filed on Jan. 31, 1994 entitled "Clutch Ball Ramp Actuator With Drive and Coast Apply" and assigned to the same assignee, Eaton Corporation, as this application.

BACKGROUND OF THE INVENTION

The present invention relates to a vehicle driveline clutch and more particularly, to a driveline clutch where a friction disc is clamped to an engine flywheel using a ball ramp actuator where a one-way clutch is used to provide drive and coast driveline clutch lock-up.

Driveline clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the clutch.

Efforts to automate the operation of the clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs and other operating conditions to determine when and in what manner the driveline clutch should be activated, or deactivated.

The use of a ball ramp actuator to load a clutch pack in a vehicle driveline differential is known. U.S. Pat. Nos. 5,092,825 and 4,805,4806, the disclosures of which are hereby incorporated by reference, disclose limited slip differentials where a clutch pack is loaded in response to the activation of a ball ramp actuator initiated by rotation of a servo motor or a solenoid driven brake shoe on an activating ring. The advantage of the ball ramp mechanism over other actuators is that it converts rotary motion into axial motion with a very high force amplification, often 100:1 or greater. A ball ramp actuator has also been utilized in a vehicle transmission to engage and disengage gearsets by loading a gear clutch pack in response to a signal as disclosed in U.S. Pat. No. 5,078,24 the disclosure of which is hereby incorporated by reference.

In both of these applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an activation ring thereby causing rolling elements to engage ramps in the control and activation ring which increase the axial movement and clamping force on the clutch pack.

One problem with the use of a ball ramp actuator to supply the clutch clamping force is that the mechanics of prior art unidirectional ball ramp mechanisms result in a loss of clamping force when the vehicle is in a coast mode. Once the engine power is reduced and the driveline is actually overrunning the engine (coast mode), the prior art ball ramp actuator with single ramp unidirectional actuation will disengage the clutch thereby eliminating the potential for engine braking of the vehicle.

In other words, this type of prior art ball ramp actuated clutch using a ball ramp having only a single ramp angle, will cause the clutch to disengage when the engine is not supplying rotational energy into the transmission when the vehicle is coasting. When coasting, the flywheel is no longer supplying rotational energy to either the transmission or the ball ramp actuator. In this circumstance, the relative rotation of the activation ring and control ring has been reversed such that the ball ramp axial displacement is collapsed thereby allowing the pressure plate to pull away from the clutch disc. The result is that the engine is disengaged from the transmission and any engine braking effort is eliminated.

The ball ramp actuator comprises a plurality of roller elements, a control ring and an opposed activation ring where the activation ring and the control ring define at least three opposed single ramp surfaces formed as circumferential semi-circular grooves, each pair of opposed grooves containing one roller element. A plurality of thrust balls (or other type of thrust bearing) are interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator. The control clutch can be similar to those commonly used for vehicle air conditioning compressors.

SUMMARY OF THE INVENTION

As an alternative, reference is made to an efficient, quick acting ball ramp clutch actuator as disclosed in patent application Ser. No. 08/165,684 filed on Dec. 13, 1993. The ball ramp mechanism in the Ser. No. 08/165,684 disclosure has dual angle ramps where the clutch is locked in both the drive and coast mode of vehicle operation. That invention also provides for a ball ramp actuator for an electronically controlled clutch such as might be used in a motor vehicle.

The present invention is characterized by a flywheel and a transmission input shaft being coupled through a control ring having single direction variable depth grooves (ramps) and an activation ring having single direction variable depth grooves at least partially opposed to those of the control ring of a ball ramp actuator where the activation ring is prevented from counterrotating by a one-way clutch. An electromagnetic coil is used to activate a control clutch which frictionally couples the control ring to the transmission input shaft. The ball ramp actuator provides a clamping force on the clutch friction disc whose amplitude immediately increases with the differential speed between the input (flywheel) and output (transmission) shafts without complex electronic intervention using the coil. Upon lock-up between the flywheel and the transmission input shaft, the parasitic energy loss is minimized since there is no slippage in the control clutch which is connected to the transmission input shaft as opposed to case ground as found in prior art systems.

One provision of the present invention is to prevent a ball ramp actuated clutch from disengaging when the input torque is reversed.

Another provision of the present invention is to prevent a ball ramp actuated clutch from disengaging by locking the rotational orientation between a control ring and an activation ring using a one-way clutch when the driveline input is reversed.

Still another provision of the present invention is to prevent a first ball ramp mechanism from disengaging when the driveline torque is reversed by locking the rotational orientation between a control ring and an activation ring using a one-way clutch having a first race connected to the activation ring and a second race connected to the control ring.

The present invention makes use of a one-way clutch defined for purposes of this application as any mechanism which permits rotation of an element in one direction and prevents substantial rotation in an opposite direction. The purpose of the one-way clutch as used in the ball ramp actuator of the present invention is to hold the actuation ring in a fixed position relative to the control ring so as to maintain the existing clamping force on the clutch plate when the input torque is reversed such as in a vehicle coast mode. Using a one-way clutch of the present invention allows a clutch having a unidirectional ball ramp actuator with single angle ramps (grooves) (which only applies a clamping load when the control ring is rotated in one direction relative to the activation ring) to apply a clutch clamping force when the engine is driving or being driven. A bidirectional ball ramp actuator such as that disclosed in U.S. Ser. No. 08/165,684 has dual angle ramps which operate in either direction of rotation and a one-way clutch would not serve any meaningful purpose other than prevent a momentary clutch release upon a vehicle drive to coast transition.

With the use of a one-way clutch acting essentially between a transmission input shaft and the actuation ring of a ball ramp actuator having single angle grooves, the clamping force of a clutch disc can be maintained as the input torque to the driveline clutch is reversed. A thrust bearing is disposed to transfer the axial movement of the ball ramp actuator.

DETAILED DESCRIPTION OF THE PREFERRED EMBODIMENT

Figure 1:
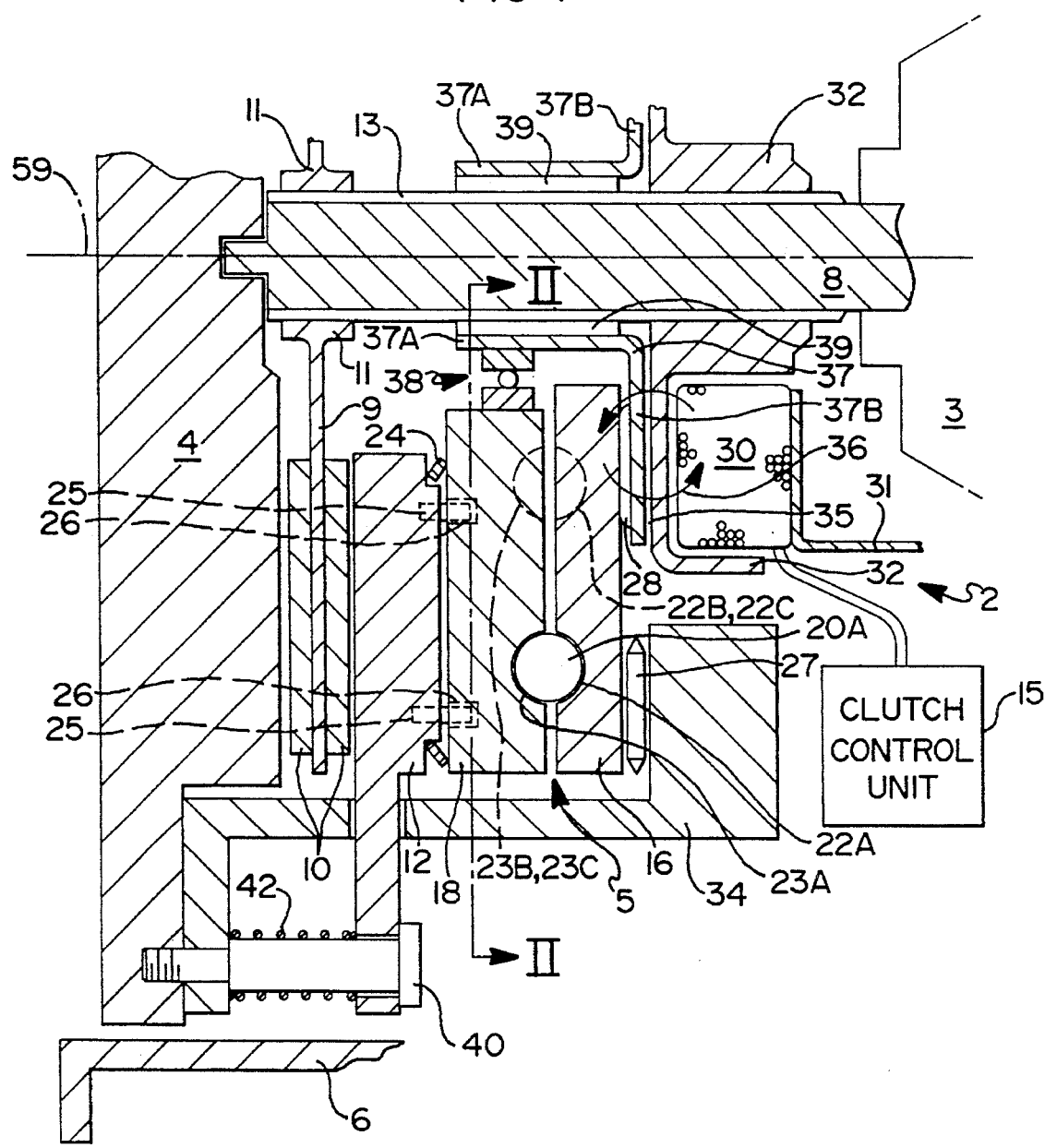
FIG. 1 is a partial cross-sectional view of the ball ramp actuator of the present invention mounted to input and output members.

Referring now to the drawings, which are not intended to limit the present invention, FIG. 1 is a partial cross-sectional view of the main driveline clutch assembly of the type in which the present invention is utilized to energize a driveline clutch by supplying an axial force to a pressure plate 12 which acts to clamp a clutch disc 9 to an engine flywheel 4. Most all of the elements herein described have circular peripheral edges and encircle the transmission input shaft 8 and rotate on a common axis of rotation 59. FIG. 1 shows only a portion of the clutch assembly elements which are symmetrical around the axis of rotation 59.

The engine flywheel 4 is rotatably driven by a prime mover (not shown) such as an internal combustion engine through its crankshaft (also not shown). The crankshaft rotates the flywheel 4 which is coupled to a transmission 3 through the driveline clutch assembly of the present invention by the clamping action of the pressure plate 12 to the clutch disc 9 which rotatably drives the transmission input shaft 8. A pressure plate 12 is used to clamp the clutch disc 9 which is nonrotatably attached to the transmission input shaft 8 through engagement of a plurality of shaft splines 13 and mating clutch disc splines 11 through attached friction pads 10 to the flywheel 4 thereby transferring the rotational power from the engine to the transmission 3 and subsequently to the rest of the vehicle driveline.

The pressure plate 12 is typically forced toward the flywheel 4 using a reaction of a plurality of high spring rate clutch springs. When the operator wishes to disengage the clutch disc 9, a mechanical release mechanism is activated by movement of the operator's foot and leg thereby overcoming the force of the clutch springs and allowing the clutch disc to slip relative to the flywheel 4. It should be understood, that neither the actuating clutch springs nor the mechanical release mechanism are features of the present invention. Instead, a first ball ramp actuator mechanism 5 is used to axially force the pressure plate 12 toward the flywheel 4 which is controlled by clutch control electronics 15 which controls most all of the transmission 3 shifting sequences.

Ball ramp mechanisms are well known in the art and have been used to load transmission gear clutches as disclosed in U.S. Pat. No. 5,078,249, the disclosure of which is hereby incorporated by reference, and differential clutch packs as disclosed in U.S. Pat. No. 5,092,825, the disclosure which is incorporated by reference. In the prior art, the ball ramp control mechanism is energized through a reaction of a control ring against case ground by an electrical coil or motor. The detailed operation of the ball ramp actuator 5 is disclosed in U.S. Pat. No. 5,078,249 and U.S. Pat. No. 5,092,825.

Figure 2:
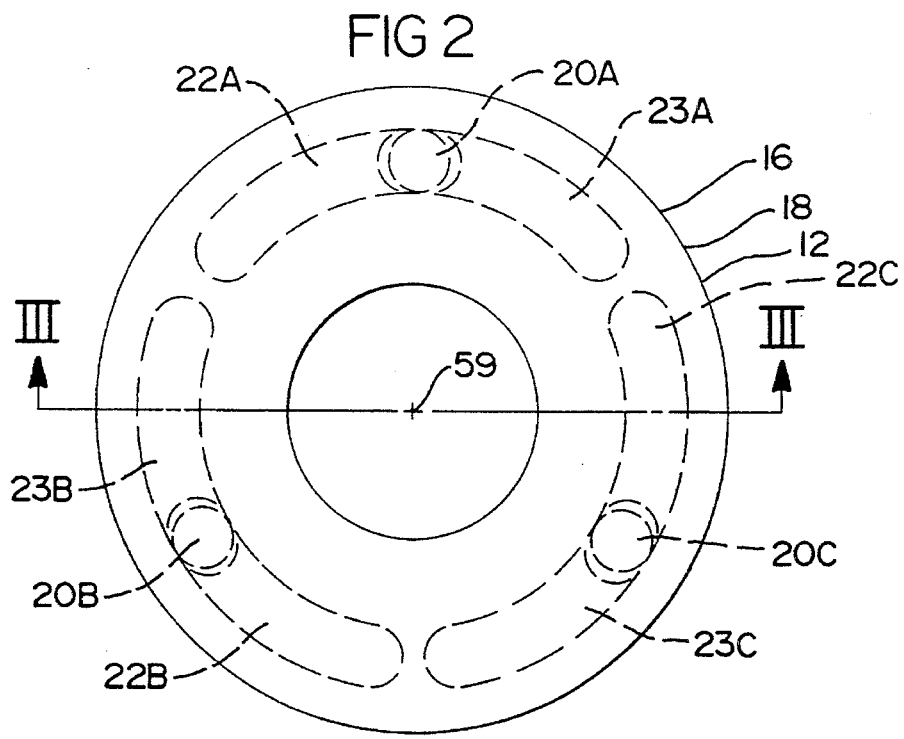
FIG. 2 a front sectional view taken along line II—II of FIG. 1 of the activation ring, control ring and pressure plate of the ball ramp actuator of the present invention.

In essence, relative motion between a control ring 16 and an activation ring 18 causes one or more rolling elements 20A (which can be spherically shaped or barrel shaped in addition to other designs) to roll along a like number of opposed ramps 22A and 23A formed in the control ring 16 and the activation ring 18. FIG. 2 illustrates this geometry with more detail and precision, reference to which is made subsequently.

Referring once again to FIG. 1, the annular control ring 16 is axially loaded by the ball ramp mechanism 5 and reacts against a thrust bearing 27 which is trapped between the control ring 16 and a mechanism support member 34 which is attached to the flywheel 4. The support bearing 27 provides for axial support of the control ring 16 while allowing for relative rotation with respect to the support member 34.

The control ring 16 is frictionally coupled to the transmission input shaft 8 through the action of an energizing coil 30 which causes the control ring 16 to be axially loaded against a friction element 28 thereby completing the coupling arrangement to the transmission input shaft 8. The coil 30 is electrically energized using a clutch control unit 15 which in turn can be controlled by a vehicle system electronic control unit (not shown). The electrical current is introduced into the coil 30 by the clutch control unit 15 where the electrical current in the coil 30 creates a magnetic field 36 which flows through the locking ring 32 through a narrow air gap 35 into the control ring 16 and then returning to the coil 30 in a circular manner. The coil 30 creates the magnetic field 36 which provides electromagnetic coupling of the control ring 16 to the locking ring 32 through the friction element 28 and control support magnetic section 37B and functions to frictionally couple the control ring 16 to the transmission input shaft 8. The coil 30 is mounted to case ground through support bracket 31 which is attached to the case of the transmission 3. The narrow air gap 35 exists between the coil 30 and the locking ring 32 since the coil 30 is grounded and the locking ring 32 rotates with the transmission input shaft 8.

A control support extension section 37A (which is joined to the magnetic section 37B to form the control support 37) supports one side of a one-way clutch 38. A second side of the one-way clutch 38 is mounted to the activation ring 18. The purpose of the one-way clutch 38 is to prevent relative rotation between the control ring 16 and the activation ring 18 so as to maintain the clamping force of the first ball ramp mechanism 5 such that the coupling between the flywheel 4 and the transmission input shaft 8 is maintained in any vehicle operating mode such as drive or coast. In this manner, the engine can act as a brake to slow the vehicle when in a vehicle coast mode since the ball ramp actuator remains in the energized state by operation of the one-way clutch 38. In the prior art, the ball ramp clutch mechanism with a one-way ramp would disengage the clutch whenever the rotational torque is reversed such as in the vehicle coast mode.

The one-way clutch 38 functions to lock the activation ring 18 to the control support extension 37A which is connected to the magnetic section 37B to form the control support 37 which is in turn rotatably connected to the transmission input shaft 8. Bushing 39 surrounds the transmission main shaft 8 and serves to rotatably support the control support 37 at the control support extension 37A. Thus, unless the coil 30 is energized, the control support 37 is free to rotate thereby allowing the one-way clutch to rotate with the control ring 16 so that the control ring 16 and the activation ring 18 are free to assume a non-energized rotational orientation.

In normal operation, when the engine is powering the vehicle driveline through rotation of its flywheel 4 then through the ball ramp clutch assembly 2, the one-way clutch 38 is free to allow motion in one direction between the activation ring 18 and control ring 16 which further clamps the pressure plate 12 acting through the plate thrust bearing 27. The one-way clutch 38 does not permit the relative rotation of the control ring 18 relative to the activation ring 16 so as to reduce the clamping force on the clutch disc 9 so long as the coil 30 is energized to magnetically connect the control support 37 through its magnetic section 37B to the transmission input shaft 8 through the locking ring 32. The clutch disc 9 is clamped between the pressure plate 12 and the flywheel 4 and is composed of a plurality of friction plates 10 and a spline 11 which slidingly and nonrotatably engages the transmission input shaft 8 through splines 13 thereby completing the torque transfer path.

When the vehicle is in a coast mode, where the driveline is powering the engine, the one-way clutch 38 locks the activation ring 18 to the locking ring 32 through the control support extension 37A where the coil 30, if energized, is also functioning to frictionally lock the control ring 16 to the control support 32, thereby maintaining the relative rotational orientation between the control ring 16 and the activation ring 18. The result is that the clamping force supplied by the control ring 18 and the activation ring 16 is maintained at its current level whenever the vehicle goes into a coast mode such that the transmission input shaft 8 transfers power to the engine flywheel 4.

The pressure plate 12 is nonrotatably coupled to the engine flywheel 4 by way of a retaining bolt 40 where the pressure plate 12 is slidably connected to the retaining bolt 40 and is forced away from the flywheel 4 by the return spring 42. In this manner, when the ball ramp mechanism 5 is in a non-energized state, the return spring 42 forces the pressure plate 12 away from the flywheel 4 thereby releasing the clutch disc 9 so that the engine flywheel 4 can freely rotate relative to the transmission input shaft 8 and no torque is transferred through the clutch assembly. The return spring 42 of the present invention operates in a direction opposite to the prior art clutch system as previously discussed. A bellhousing 6 surrounds the flywheel 4 and the ball ramp clutch assembly 2 where it is common practice to bolt the transmission 3 to the bellhousing 6.

Figure 3:
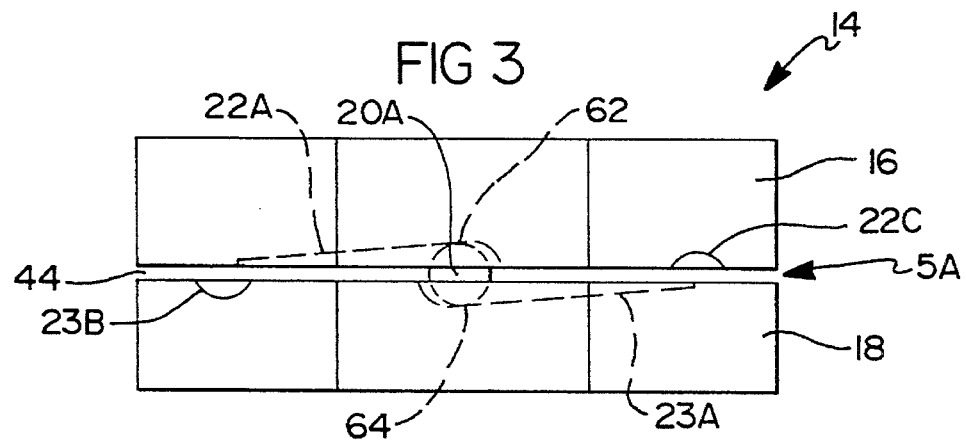
FIG. 3 is a sectional view of FIG. 2 taken along line III—III of FIG. 2 of the ball ramp actuator of the present invention with the actuator in a non-energized state.

Now referring to FIGS. 2 and 3, the control ring 16 is shaped in a disc configuration surrounding the transmission input shaft 8 and rotating about a common axis of rotation 59. The control ring 16 has a plurality of radial grooves 22A, 22B and 22C formed therein which vary in axial depth along their length. Grooves 22A, 22B and 22C are shown in more detail by reference to FIG. 3 and constrain spherical elements 20A, 20B and 20C. In a similar manner, activation ring 18 contains a like number and orientation of circumferentially extending (at a constant radius to the axis of rotation 59) grooves 23A, 23B and 23C directly opposing the grooves 22A, 22B and 22C in the control ring 16. Specifically, control ring groove 22A is partially opposed to activation ring groove 23A when the ball ramp mechanism 5 is in a non-energized state as shown in FIG. 3 and directly opposes the activation ring groove 23A when in a fully energized state (not shown).

Figure 4:
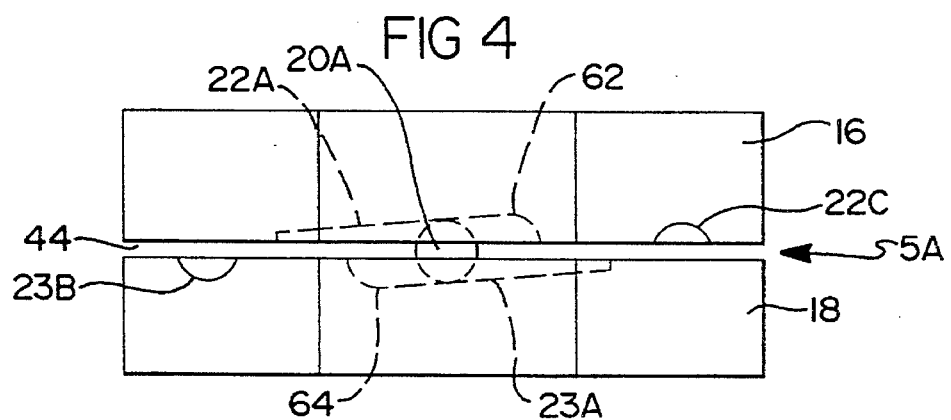
FIG. 4 is a sectional view of FIG. 2 taken along line III—III of FIG. 3 of the ball ramp actuator of the present invention with the first ball ramp actuator in an energized state.

Upon relative rotational motion between the control ring 16 and the activation ring 18, the spherical element 20A rolls relative to the control ring groove 22A and activation control ring groove 23A where the variable depth of the grooves 22A and 23A as shown in FIG. 4 provide for an axial motion that tends to separate the control ring 16 from the activation ring 18. This axial motion is shown by reference to the separation gap 44. In the non-energized state as shown in FIG. 3, the separation gap 44 is relatively narrow and after relative rotation of the control ring 16 and the activation ring 18 to the energized state shown in FIG. 4, the separation gap is significantly wider as discussed infra.

The axial motion supplied by the first and second ball ramp mechanisms 5 are used to axially move the pressure plate 12 toward the flywheel 4 thereby supplying a clamping force on the clutch disc 9. This motion is more clearly exemplified in FIGS. 3 and 4 and reference thereto will now be made. FIGS. 3 and 4 are sectional views of FIG. 2 taken along line III—III of the control ring 16 and the activation ring 18 of the present invention. FIG. 3 shows the ball ramp mechanism 5 in a non-energized state where the spherical element 20A is located at the deepest depth of the control ring groove 22A and the deepest portion of the activation ring groove 23A thereby establishing a relatively narrow separation gap 44 between the control ring 16 and the activation ring 18.

FIG. 4 illustrates the relationship between the control ring 16, the activation ring 18 and the pressure plate 12 when the ball ramp mechanism 5 is energized by supplying electrical current to the coil 30 from the clutch control unit 15 and the engine is supplying torque to the driveline. The magnetic interaction between the coil 30, the locking ring 32, the control support 37 and the control ring 16 causes the friction element 28 to contact and frictionally connect the control ring 16 to the transmission input shaft 8. Thus, since the pressure plate 12 is rotating and attached to the engine flywheel 4, if there is relative rotational speed differences between the engine flywheel 4 and the transmission input shaft 8 there is relative rotational motion induced between the pressure plate 12 and the control ring 16. This relative rotational motion causes the control ring 16 to rotate relative to the activation ring 18 to establish a geometrical relationship as shown in FIG. 4. The separation gap 44 is significantly increased as compared to the non-energized state of FIG. 3 while the separation gap 46 remains the same as in the non-energized state in FIG. 3 since the second ball ramp mechanism 5 is locked until the torque is reversed. The spherical element 20A has rolled along both the control ring groove 22A and the activation ring groove 23A to an intermediate depth of the grooves 22A and 23A thereby further separating the control ring 16 from the activation ring 18 and providing axial movement from the support member 34 as shown by the increase in the separation gap 44 which is transferred to the pressure plate 12 for clamping of the clutch disc 9 to the flywheel 4.

The activation ring 18 is nonrotatably coupled to the pressure plate 12 through one or more pins 25. The pins 25 are fixed in the pressure plate 12 and slidingly engage the activation ring 18 through a like number of pin depressions 26 formed in the activation ring 18. The activation ring 18 axially presses against the pressure plate 12 through the Belville spring 24 which functions to cushion the ball ramp mechanism 5 from high level impact loads. Thus, as the activation ring 18 is axially moved toward the flywheel 4, the pressure plate 12 is forced by the activation ring 18 acting through the Belville spring 24 so as to clamp the clutch disc 9 against the flywheel 4.

To provide engine braking effect in the vehicle coast operating mode, the coil 30 remains energized and the one-way clutch 38 operates against the control support 37 to prevent the ball ramp mechanism 5 from releasing.

According to the present invention, once the clutch assembly 2 is engaged by action of the ball ramp mechanism 5, the engine can supply power to the vehicle driveline thereby propelling the vehicle. When it is no longer desirable to increase the speed of the vehicle by supplying power from the engine to the driveline, the engine power is decreased and the engine can act as a brake to the vehicle by reversing the flow of rotational power from the engine to the driveline to one flowing from the driveline to the engine. The one-way clutch 38 serves to maintain the relative rotational position of the activation ring 18 relative to the control ring 16 and the pressure plate 12 thereby maintaining the clamping force between the pressure plate 12 and the flywheel 4 to maintain the frictional coupling between the transmission input shaft 8 and the flywheel 4 so that the driveline can supply rotational power to the engine which, if the engine throttle is closed, will tend to brake the vehicle.

This invention has been described in great detail, sufficient to enable one skilled in the art to make and use the same. Various alterations and modifications of the invention will occur to those skilled in the art upon the reading and understanding of the foregoing specification, and it is intended to include all such alterations and modifications as part of the invention, insofar as they come within the scope of the intended claims.

We claim:

1. A ball ramp mechanism for coupling two rotating elements comprising:

an input element driven by a prime mover and rotating about an axis of rotation;

an output element having an axis of rotation coaxial with said axis of rotation of said input element for rotating an output device;

a ball ramp actuator for generating an axial movement comprising; an annular control ring magnetically coupled to said output element and rotating therewith, said control ring having at least two circumferential control ramps formed in a first face of said control ring, said control ramps varying in axial depth, an equivalent number of rolling elements one occupying each of said ramps, an activation ring having an axis of rotation along said axis of rotation of said control ring, said activation ring having at least two activation ramps substantially identical in number, shape and radial position to said control ramps in said control ring where said activation ramps at least partially oppose said control ramps and where each of said rolling elements is trapped between said activation ramp and a respective at least partially opposed control ramp, said control ring axially and rotationally movably disposed relative to said activation ring;

coupling means for rotatably joining said input element to said output element where said coupling means varies the degree of rotational coupling between said input element and said output element according to the axial position of said control ring relative to said activation ring;

a locking ring nonrotatably attached to said output member;

a control support element disposed between said control ring and said locking ring, said control support element rotatably supported by said output element;

a coil for creating a magnetic field said locking ring and said control ring and said control support element thereby magnetically joining said control ring to said output element, said coil being electrically energized by a clutch control unit where said activation ring rotates with said input element and said control ring rotates with said output element according to said control means;

clutch means for preventing said activation ring from rotating relative to said control ring in a direction deactivating said ball ramp actuator when said coil is energized, said clutch means attached to said control support and to said activation ring.

2. The ball ramp mechanism of claim 1, wherein said input element comprises a flywheel and where said output element comprises a transmission input shaft, said flywheel rotatably joined to said coupling means.

3. The ball ramp mechanism of claim 1, wherein said coil is attached to a transmission case.

4. The ball ramp mechanism of claim 1, wherein a friction pad is mounted to said control support element for frictionally contacting said control ring and supplying a rotational torque thereto.

5. The ball ramp mechanism of claim 1, wherein said rolling elements are spherically shaped.

6. The ball ramp mechanism of claim 1, wherein said coupling means is a friction clutch assembly comprising: a flywheel attached to said input element having a friction surface; a clutch disc having a first friction surface for frictionally reacting against said flywheel friction surface and a second friction surface; a pressure plate having a friction surface for frictionally reacting against said clutch disc second friction surface where said pressure plate is connected to said flywheel and nonrotatably connected to said activation ring.

7. A driveline clutch for coupling a flywheel to a transmission input shaft comprising:

a flywheel rotated about an axis of rotation by a prime mover;

a driveline transmission having an input shaft and a housing;

a clutch disc splined to said input shaft radially extending from said input shaft and having friction material on a first surface and a second surface where said first surface frictionally engages said flywheel;

a pressure plate encircling said input shaft having a first surface for frictionally engaging said second surface of said clutch disc;

a ball ramp mechanism for moving said pressure plate toward said clutch disc and said flywheel thereby causing said clutch disc to be clamped therebetween comprising; an activation ring encircling said input shaft, said activation ring being axially slidingly connected to said pressure plate where axial movement of said activation ring results in axial movement of said pressure plate acting through a spring, a control ring encircling said input shaft and disposed adjacent to said activation ring, said control ring and said activation ring having opposed faces provided with circumferentially extending grooves, arranged in at least three opposed pairs of grooves, said grooves having portions of varying depth, and rolling members disposed one in each opposed pair of grooves, the grooves on said activation ring and said adjacent control ring being arranged so that relative angular movement of axial activation ring and control ring in either direction, from a starting position thereof, causes axial movement of said activation ring away from said control ring and operating through said spring to axially displace said adjacent pressure plate;

bearing means operative to absorb axial thrust loads from said control ring, said bearing means reacting against said flywheel through a support member;

a control clutch having a first friction element attached to said control ring and a second friction element nonrotatably attached to said input shaft where upon application, said control clutch frictionally couples said control ring to said input shaft;

a locking ring nonrotatably attached to said output member;

a control support having a magnetic section disposed between said control ring and said locking ring, said control support having a control support extension section rotatably supported by said input shaft;

a one-way clutch having one side attached to said activation ring and a second side attached to said control support oriented to prevent said activation ring from rotating with respect to said control ring in a direction to release said ball ramp mechanism;

a coil for inducing a magnetic field in said control ring, said control support and said locking ring thereby magnetically coupling said control ring to said transmission input shaft.

8. The driveline clutch of claim 7, wherein said control support has a friction element attached to said magnetic section disposed to frictionally engage said control ring upon energization of said coil.

9. The driveline clutch of claim 7, wherein said rolling members are spherical.

10. A driveline clutch employing a ball ramp actuator comprising:

an input shaft rotatable about an axis of rotation;

an output shaft rotating about said axis of rotation;

a flywheel having a friction surface, said flywheel attached to said input shaft and rotating therewith about said axis of rotation;

a clutch disc having a first friction surface and a second friction surface rotatable about said axis of rotation of said input shaft, said first friction surface opposed to said flywheel friction surface;

a pressure plate having a friction surface opposed to said second friction surface of said clutch disc, said pressure plate rotatable about said axis of rotation and nonrotatably connected to said flywheel;

a ball ramp actuator for axially displacing said pressure plate toward said flywheel, said first ball ramp actuator comprising a control ring and an activation ring having opposed faces provided with circumferentially extending grooves, arranged as at least three opposed pairs of grooves, including portions of varying depth, and rolling members disposed one in each opposed pair of grooves, said grooves on said activation ring and said adjacent control ring being arranged so that relative angular movement of said activation ring and said control ring in a first direction, from a starting position thereof, causes axial movement of said activation ring away from said control ring to move said pressure plate toward said flywheel thereby clamping said clutch disc, said actuation plate being linked to said pressure plate, said control ring and said actuation ring being rotatable about said axis of rotation;

a one-way clutch having one side releasably attached to said transmission input shaft and a second side attached to said activation ring for preventing relative rotation of said activation ring and said control ring in a direction deactivating said ball ramp actuator when said coil is energized;

coupling means for linking said output shaft to said control ring.

11. The driveline clutch of claim 10, wherein said coil is electrically energized by an electronic clutch control unit.

12. The driveline clutch of claim 10, wherein said coupling means is comprised of a locking ring nonrotatably attached to said transmission input shaft, said locking ring disposed in relatively close proximity to said coil, and a control ring having a magnetic section disposed between said coupling ring and said locking ring and an extension section rotatably attached to said transmission input shaft where said magnetic section frictionally engages said locking ring and rotates therewith when said coil is electrically energized by said clutch control unit.

13. The driveline clutch of clutch of claim 12, wherein a friction disc is attached to said magnetic section where said friction disc contacts said control ring when said coil is electrically energized by said clutch control unit.

* * * * *